United States Patent
Sakae et al.

(10) Patent No.: US 9,088,214 B2
(45) Date of Patent: Jul. 21, 2015

(54) SWITCHING POWER SUPPLY CIRCUIT

(75) Inventors: Norio Sakae, Shiga (JP); Toshio Yabuki, Shiga (JP); Kazuhiro Ohshita, Shiga (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 13/580,691

(22) PCT Filed: Feb. 22, 2011

(86) PCT No.: PCT/JP2011/053801
§ 371 (c)(1),
(2), (4) Date: Aug. 23, 2012

(87) PCT Pub. No.: WO2011/122172
PCT Pub. Date: Oct. 6, 2011

(65) Prior Publication Data
US 2013/0015786 A1 Jan. 17, 2013

(30) Foreign Application Priority Data

Mar. 29, 2010 (JP) .................. 2010-074832

(51) Int. Cl.
*H02K 7/14* (2006.01)
*H02P 27/04* (2006.01)
*H02M 3/158* (2006.01)
*H02M 1/42* (2007.01)

(52) U.S. Cl.
CPC .......... *H02M 3/1584* (2013.01); *H02M 1/4225* (2013.01); *H02M 2003/1586* (2013.01); *Y02B 70/126* (2013.01)
USPC ............................................. 318/3; 318/801

(58) Field of Classification Search
USPC ...................................................... 318/3, 801
See application file for complete search history.

(56) References Cited

U.S. PATENT DOCUMENTS

| 5,793,623 | A  | * | 8/1998 | Kawashima et al. ...... 363/56.05 |
| 7,012,413 | B1 | * | 3/2006 | Ye ................................. 323/284 |
| 2010/0089082 | A1 | * | 4/2010 | Kawano et al. ................. 62/192 |

(Continued)

FOREIGN PATENT DOCUMENTS

| CN | 1121164 A | 4/1996 |
| CN | 1428922 A | 7/2003 |
| JP | 8-182329 A | 7/1996 |

(Continued)

OTHER PUBLICATIONS

Kitamura, "Critical Mode for Creating Power Supply Against 1.5 kW Low Noise/Interleaved PFC IC R2A20112", Transistor Gijutsu, CQ Publishing Co., Ltd., May 2008, 6 pages, including partial English translation.

(Continued)

*Primary Examiner* — Eduardo Colon Santana
*Assistant Examiner* — Gabriel Agared
(74) *Attorney, Agent, or Firm* — Birch, Stewart, Kolasch & Birch, LLP

(57) ABSTRACT

A reactor, a diode, and a switching element connected to a path constitute a booster circuit, and another reactor, another diode, and another switching element connected to another path constitute another booster circuit. The booster circuits also function as a power factor correction circuit for correcting a power factor of the input side. Swing chokes are adopted as the reactors.

18 Claims, 6 Drawing Sheets

(56) References Cited

U.S. PATENT DOCUMENTS

2011/0101898 A1\* 5/2011 Shinomoto et al. ........ 318/400.3
2011/0132899 A1\* 6/2011 Shimomugi et al. .......... 219/620

FOREIGN PATENT DOCUMENTS

| JP | 9-224369 A | 8/1997 |
| JP | 2007-195282 A | 8/2007 |
| WO | 2010/023978 A1 | 3/2010 |

OTHER PUBLICATIONS

Satoh, "LC Element of Power Supply Circuit", The Hotline, vol. 25, published in 1997, pp. 37-42, including partial English translation of relevant portions of pp. 39 and 40.

Spang & Company, Magnetics Division, "Step-gap "E" Core Swing Chokes", Technical Bulletin FC-S4, 2001 (Bulletin Date Unknown), 4 pages.

\* cited by examiner

F I G. 1
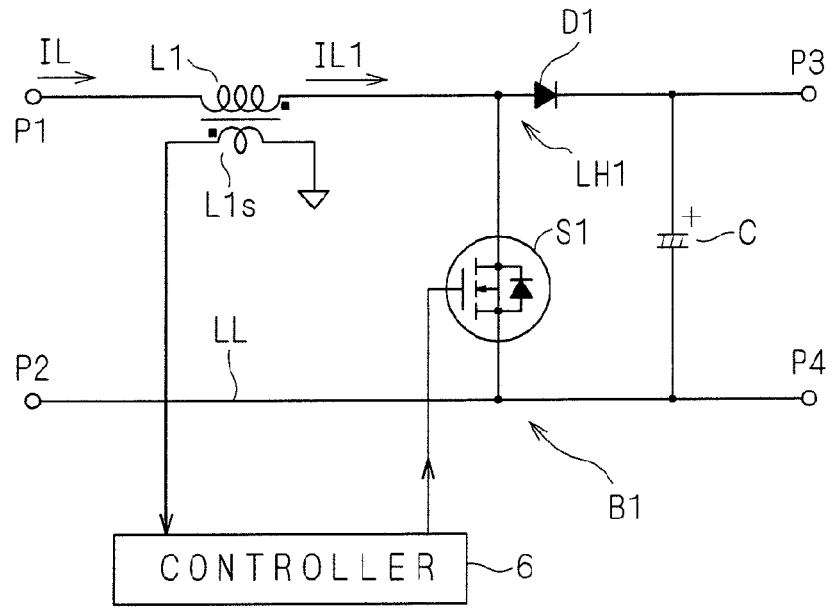
F I G. 2
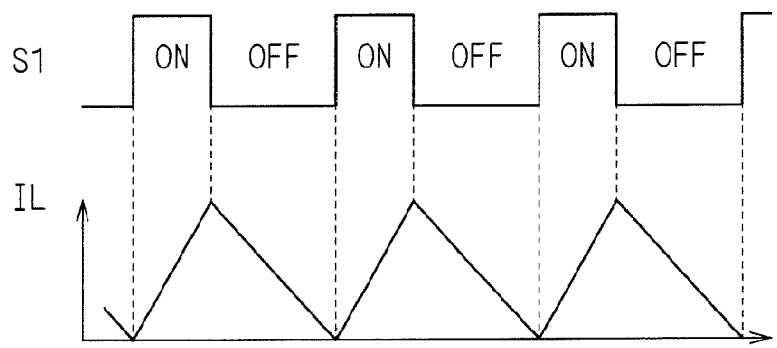
F I G. 3
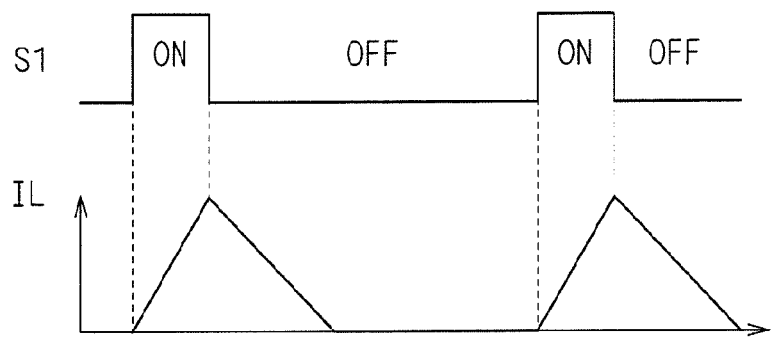

F I G. 5
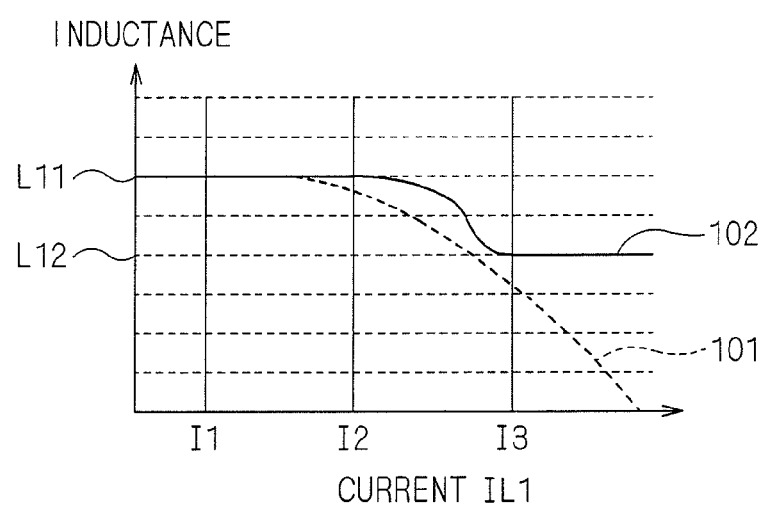

F I G. 1 1
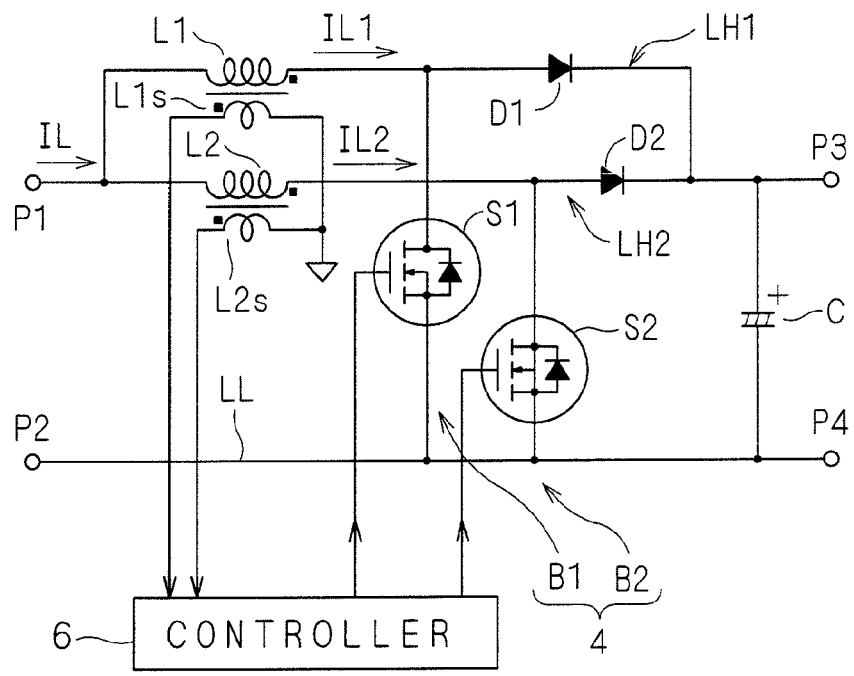
F I G. 1 2
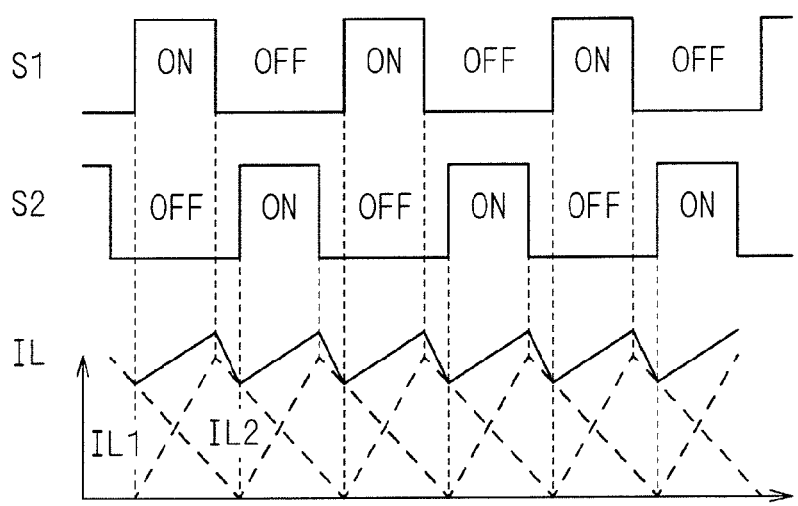

SWITCHING POWER SUPPLY CIRCUIT

TECHNICAL FIELD

The present invention relates to a switching power supply circuit, and more particularly, to a power factor correction circuit.

BACKGROUND ART

Japanese Patent Application Laid-Open No. 9-224369 (1997) discloses a current resonance type DC-DC converter, and also discloses a converter provided with a swing type choke coil (hereinafter, "swing choke") and a resonance choke coil connected in parallel therewith.

Mamoru Kitamura, 'Critical Mode for Creating Power Supply against 1.5 kW Low Noise/Interleaved PFC IC R2A20112', Transistor Gijutsu, May 2008, CQ Publishing Co., Ltd., pp. 176-184 discloses a pair of power factor correction circuits operating in a critical current mode and in an interleaved manner (hereinafter, merely referred to as "interleaved power factor correction circuit"). In the interleaved power factor correction circuit, a pair of boosting chopper circuits are connected in parallel, and reactors, diodes, and switching elements are provided. For example, a MOS field effect transistor is adopted as such a switching element.

Morio Satoh, LC element of power supply circuit' [online] Available at: <http://www.tdk.co.jp/tjbcd01/bcd23_26.pdf> retrieved on 5 Mar. 2010, pp. 12-13 (THE HOTLINE vol. 25, pp. 39 and 40) discloses a continuous current mode, a critical current mode, and a non-continuous current mode regarding the current flowing through a reactor, and also discloses a swing choke.

SUMMARY OF INVENTION

Problems to be Solved by the Invention

The operation of a power factor correction circuit in a continuous current mode results in that switching is performed when a current is flowing through a diode, which is not desired in terms of an increase in electrical noise. Therefore, it is desirable to use the power factor correction circuit in a non-continuous current mode or a critical current mode. For example, in an interleaved power factor correction circuit, the critical current mode is normally adopted for the current flowing through a reactor.

A large inductance of the reactor in the power factor correction circuit tends to result in the continuous current mode when a large current flows through the power factor correction circuit. Alternatively, even if the power factor correction circuit can be operated in the critical current mode not in the continuous current mode, the switching frequency decreases for causing a large current to flow therethrough when the inductance is large. This is not desirable in that the frequency of mechanical vibration has a tendency to enter an audible range to cause audible noise.

Therefore, in a case of adopting a power factor correction circuit, particularly, an interleaved power factor correction circuit in which a critical current mode is adopted is used for large power, it is desired to lower the inductance of a reactor.

However, if the inductance of the reactor is lowered in the critical current mode, the switching frequency becomes high in a situation in which a load is small. This incurs problems such as an increase of noise that occurs with switching and a decrease of efficiency due to an increase in switching loss of a switching element in a power factor correction circuit.

When a power factor correction circuit is operated in a non-continuous current mode, it is possible to prevent the switching frequency from increasing in a situation in which the inductance of a reactor is small and a load is small as well. However, without an increase of the switching frequency, the current flowing through the switching element increases, and not only a switching loss increases but also a conduction loss of the switching loss increases, leading to a reduction of efficiency.

Therefore, an object of the present invention is to provide a switching power supply circuit for improving the trade-off between prevention of efficiency reduction and prevention of audible sound by properly setting characteristics of a reactor in a power factor correction circuit in which a boosting chopper is adopted.

Means to Solve the Problems

A first aspect of the present invention relates to a switching power supply circuit (4) supplying a DC current to an inverter (5) that drives a refrigerant compressor (7) provided in a refrigerant cycle (900) and functioning in a critical current mode or a non-continuous current mode. There are included: first and second input ends (P1, P2); first and second output ends (P3, P4); a first path (LH1) connecting the first input end and the first output end; a first reactor (L1) provided on the first path; a first diode (D1) connected in series with the first reactor on the first output end side on the first path and having an anode directed to the first reactor side; a second path (LL) connecting the second input end and the second output end; and a first switching element (S1) provided between a point located between the first reactor and the first diode and the second path.

An inductance of the first reactor takes a first value (L11) at a maximum value of a current flowing through the first reactor when the refrigerant cycle operates at intermediate operating capacity or capacity lower than the intermediate operating capacity, and the inductance of the first reactor takes a second value (L12) smaller than the first value at a maximum value of a current flowing through the first reactor when the refrigerant cycle transiently operates at the capacity exceeding full-load operating capacity and when the refrigerant cycle operates at the full-load operating capacity.

According to a second aspect of the present invention, in the switching power supply circuit of the first aspect, the inductance of the first reactor takes the first value at a maximum value of a current flowing through the first reactor when the refrigerant cycle operates at rated capacity.

According to a third aspect of the present invention, in the switching power supply circuit of the first or second aspect, the inductance of the first reactor takes a value for making a switching frequency of the first switching element equal to or larger than an audible frequency.

According to a fourth aspect of the present invention, the switching power supply circuit of any one of the first, second, and third aspects further includes: a third path (LH2) connecting the first input end and the first output end and differing from the first path; a second reactor (L2) provided on the third path; a second diode (D2) connected in series with the second reactor on the first output end side on the third path and having an anode directed to the second reactor side; and a second switching element (S2) provided between a point located between the second reactor and the second diode and the second path (LL) and being rendered conducting exclusively from the first switching element.

According to a fifth aspect of the present invention, in the switching power supply circuit of any one of the first, second, third, and fourth aspects, the first switching element and the first reactor are mounted on the same printed circuit board.

The refrigerant cycle is, for example, an air conditioner.

Effects of the Invention

The operating capacity of the refrigerant cycle varies in a wide range from the capacity lower than the intermediate operating capacity to the full-load operating capacity, and the load of the inverter varies greatly as well. According to the first aspect of the power factor correction circuit of the present invention, the noise generated by the switching power supply circuit does not readily reach the audible sound range even if the load of the inverter is large, so that a loss caused in a case of the small load is lowered.

According to the second aspect of the power factor correction circuit of the present invention, a loss is also reduced at the rated capacity.

According to the third aspect of the power factor correction circuit of the present invention, the noise generated by the switching power supply circuit does not reach the audible sound range, so that the generation of noise is prevented.

According to the fourth aspect of the power factor correction circuit of the present invention, a so-called interleaving operation is achieved, whereby ripples of the current input to the power factor correction circuit are reduced.

According to the first to fourth aspects of the power factor correction circuit of the present invention, the first reactor generates a small amount of heat. Accordingly, if the first reactor is mounted on the printed circuit board on which the first switching element is mounted, the first switching element is not affected much by the heat generation, which is preferred particularly in a case where a semiconductor element is adopted as the first switching element. Therefore, according to the fifth aspect of the power factor correction circuit of the present invention, the connection line for connecting the substrate on which the first switching element is mounted and the first reactor is not required, which not only reduces the number of parts but also prevents the noise resulting from the connection line.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a circuit diagram showing a configuration of a power factor correction circuit according to an embodiment of the present invention;

FIG. 2 is a graph showing an operation in a critical current mode;

FIG. 3 is a graph showing an operation in a non-continuous current mode;

FIG. 5 is a graph showing an inductance of a reactor adopted in the power factor correction circuit;

FIG. 11 is a circuit diagram showing a configuration of an interleaved power factor correction circuit according to the embodiment of the present invention; and FIG. 12 is a graph showing an operation of the interleaved power factor correction circuit.

EMBODIMENT FOR CARRYING OUT THE INVENTION

Figure 4:
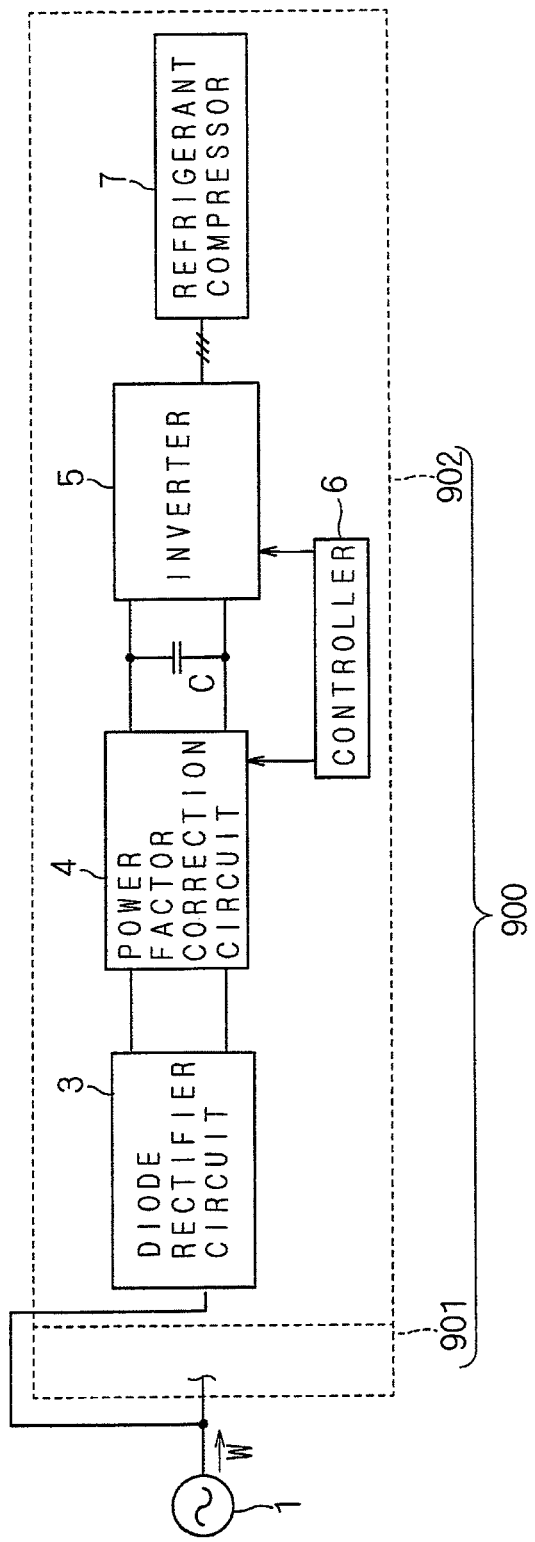
FIG. 4 is a block diagram illustrating a configuration of an air conditioner 900.

As illustrated in FIG. 1, a switching power supply circuit according to the present embodiment includes input ends P1 and P2, output ends P3 and P4, a reactor L1, a diode D1, a switching element S1, and a smoothing capacitor C.

A DC voltage is applied between the input ends P1 and P2. For example, a diode rectifier circuit (not shown) is connected to the input ends P1 and P2. The diode rectifier circuit rectifies an AC voltage from an AC power supply, and applies a DC voltage after the rectification between the input ends P1 and P2. Here, a potential applied to the input end P2 is lower than a potential applied to the input end P1. It is not necessarily required that the diode rectifier circuit be connected to the input ends P1 and P2. It suffices that any configuration for applying a DC voltage between the input ends P1 and P2 is connected to the input ends P1 and P2.

The reactor L1 is provided on a path LH1 connecting the input end P1 and the output end P3.

The diode D1 is connected in series with the reactor L1 on the output end P3 side on the path LH1. The diode D1 has an anode directed to the reactor L1.

The switching element S1 is provided between a point located between the reactor L1 and the diode D1 and a path LL connecting the input end P2 and the output end P4. Note that FIG. 1 illustrates the switching element S1 as a MOS field effect transistor, which is not limited thereto. The switching element S1 may be, for example, an insulating gate bipolar transistor or a bipolar transistor.

The term "MOS" has been used for the laminated structure of metal/oxide/semiconductor, which was named from the initial letters of Metal-Oxide-Semiconductor. Particularly in a field effect transistor having a MOS structure ("MOS field effect transistor"), however, improvements have been made on materials of a gate insulating film and a gate electrode from the viewpoint of for example, recent improvements in integration and manufacturing process.

For example, polycrystalline silicon has now been adopted as the material of the gate electrode in place of metal mainly from the viewpoint of forming a source and a drain in a self-alignment manner. Although a material having a high dielectric constant is adopted as the material of the gate insulating film from the viewpoint of improving electrical characteristics, the material is not necessarily limited to oxides.

Therefore, the adoption of the term "MOS" is not necessarily limited to the laminated structure of metal/oxide/semiconductor, and the present specification is not based on such limitation. That is, in view of common technical knowledge, "MOS" herein not only is used as an abbreviation derived from its word origin but also has a broad meaning including a laminated structure of conductor/insulator/semiconductor.

The smoothing capacitor C is provided between the output ends P3 and P4. The smoothing capacitor C smoothes the DC voltage applied from the input ends P1 and P2 through the reactor L1, the diode D1, and the switching element S1.

The reactor L1, the diode D1, and the switching element S1 that are connected to the path LH1 constitute a booster circuit B1, and the booster circuit B1 constitutes a switching power supply circuit together with the smoothing capacitor C. The booster circuit B1 also functions as a power factor correction circuit for correcting the power factor of the input side.

Based on a current IL1 flowing through the reactor L1, the controller 6 controls conduction/non-conduction of the switching element S1 in a critical current mode as shown in, for example, FIG. 2 or in a non-continuous current mode as shown in, for example, FIG. 3.

In the present embodiment, a reactor L1s is provided for detecting the current IL1. The reactor L1s constitutes a transformer together with the reactor L1. The controller 6 detects a current flowing through the reactor L1s and estimates the current IL1.

FIG. 4 is a block diagram illustrating the configuration of an air conditioner 900 that is a refrigerant cycle in which a power factor correction circuit 4 according to the present embodiment is adopted. The air conditioner 900 includes an indoor unit 901 and an outdoor unit 902. The indoor unit 901 and the outdoor unit 902 are both supplied with AC power from a commercial power supply 1, and the total amount of the AC power is indicated as power W. The above-mentioned booster circuit B1 can be adopted as the power factor correction circuit 4. In place of the air conditioner 900, a well-known heat-pump-type refrigerant cycle, for example, a water heater can be adopted.

The air conditioner 900 is provided with a refrigerant compressor 7 and an inverter 5 driving this in the outdoor unit 902. The power factor correction circuit 4 operates in a critical current mode or a non-continuous current mode and supplies a DC current to the inverter 5.

A diode rectifier circuit 3 is also provided in the outdoor unit 902, which rectifies an AC voltage from the commercial power supply 1 and supplies a DC voltage after the rectification to the power factor correction circuit 4.

The controller 6 controls not only the operation of the power factor correction circuit 4 but also that of the inverter 5.

The technique of controlling conduction/non-conduction of the switching element S1 and the inverter 5 is well known, which is not described here further.

Here, the controller 6 includes a microcomputer and a storage device. The microcomputer executes process steps (in other words, procedures) described in a program. The storage device can be configured with, for example, one or a plurality of various storage devices such as a read only memory (ROM), a random access memory (RAM), a rewritable non-volatile memory (for example, an erasable programmable ROM (EPROM)), and a hard disk device. The storage device stores various types of information, data, and the like, and also provides a work area for executing the program. The microcomputer can be understood to function as various means corresponding to the process steps described in the program or can be understood to implement various functions corresponding to the process steps. The controller 6 is not limited to the above, and various procedures executed by the controller 6, or various means or various functions implemented thereby may be partially or wholly implemented as hardware.

In the present embodiment, a swing choke is adopted as the reactor L1.

In FIG. 5, an inductance of a normal reactor and an inductance of the swing choke are indicated by a curve 101 and a curve 102, respectively. Illustrated here is the case where the inductances of those are equal to each other in an area of a small current.

The switching power supply circuit according to the present embodiment is driven by causing a current to flow through the reactor L1 in a non-continuous current mode or a critical current mode. Normally, the current input to the input ends P1 and P2 is the DC rectified by the diode rectifier circuit 3 and, for example, a sine wave is input to the diode rectifier circuit 3.

Description is given below of the current IL1 that flows through the reactor L1 in a case where a swing choke is adopted as the reactor L1.

As indicated by the curve 102 in FIG. 5, the inductance of the swing choke shows almost flat characteristics in an area of a large current, and the inductance in the area of a small current flowing through the swing choke is larger than the inductance in the area of a large current. In other words, the curve 102 has at least two inflection points.

Values I1, I2, and I3 of the current IL1 correspond to the maximum currents when the power W supplied to the air conditioner 900 takes intermediate operating power consumption, rated operating power consumption, and full-load operating power consumption (see JIS C9612), respectively. That is, the maximum value of the current IL1 takes the value I1 when the air conditioner 900 operates at the intermediate operating capacity, the maximum value of the current IL1 takes the value I2 when the air conditioner 900 performs a rated operation, and the maximum value of the current IL1 takes the value I3 when the air conditioner 900 operates at the full-load operating capacity (I3>I2>I1). Alternatively, the rated operating power consumption may conform to ISO 5151-1 and, in this case, the intermediate power consumption is understood as a half of the rated operating power consumption. The full-load operating capacity is the capacity at which an air conditioner is capable of continuous output, which is specified by a producer of the air conditioner, in a cooling operation, and is 1.38 times the heating full-load operating power consumption at low temperature defined in the standard above in a heating operation.

The inductance of the reactor L1 takes a value L11 in a case where the current IL1 when the air conditioner 900 operates at the intermediate operating capacity or the capacity lower than the intermediate operating capacity takes the maximum value I1, and takes a second value L12 (<L11) in a case where the current IL1 when the air conditioner 900 operates at the full-load operating capacity or transiently operates at the capacity exceeding the full-load operating capacity takes the maximum value I1.

Figure 6:
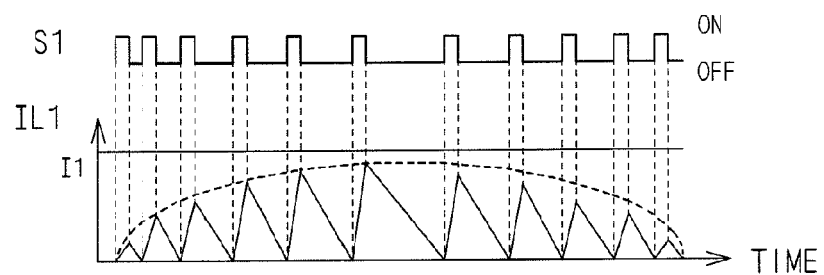
FIG. 6 is a graph showing a current flowing through a reactor.

FIG. 6 is a graph showing the case where the current IL1 takes a value smaller than the value I1. A dashed line added to the current IL1 shows an outline of an envelope of the current IL1. The envelope is controlled to have a sine wave shape (for example, see FIG. 14 and the like of Mamoru Kitamura, 'Critical Mode for Creating Power Supply against 1.5 kW Low Noise/Interleaved PFC IC R2A20112', Transistor Gijutsu, May 2008, CQ Publishing Co., Ltd., pp. 176-184), and thus, if the current IL1 is small, the frequency for conduction/non-conduction of the switching element S1 (that is, switching frequency) becomes high in the critical current mode, which tends to result in a large switching loss. If the current IL1 is small, the current caused to flow when the switching element S1 is in conduction increases in the non-continuous current mode unless the switching frequency is increased. This incurs increases in switching loss as well as conduction loss, leading to a decrease of efficiency. For this reason, it is desired that the value L11 of the inductance of the reactor L1 be made high so that the current IL1 does not readily rise even if the switching element S1 is rendered conducting.

In this manner, in a case where the air conditioner 900 is operated at the intermediate operating capacity or less, those losses can be reduced, which enables an efficient operation.

Generally, the times when the outside temperature reaches a temperature at which air condition is required (for example, see Table 3 and Table 6 of Appendix 3 of JIS C9612) are centered on the temperature at which an air conditioner is required to operate at the intermediate capacity or less. Therefore, the annual performance factor (APF; see Appendix 3 of JIS C9612) is improved for enhancing efficiency in a case of the intermediate operation capacity or lower.

In order to further improve the annual performance factor, the inductance of the swing choke adopted as the reactor L1 may take the value L11 until the current IL1 reaches the value I2 corresponding to the rated operation, as indicated by the curve 102 in FIG. 5.

Generally, the conduction loss of an insulated gate bipolar transistor is expressed by the product of the current flowing through the insulated gate bipolar transistor and the voltage between the emitter and collector thereof. Meanwhile, the conduction loss of a MOS field effect transistor is expressed by the product of a square of the current flowing through the MOS field effect transistor and an on-resistance thereof Normally, the voltage between the emitter and collector of the insulated gate bipolar transistor is approximately 1.5 V, and the on-resistance of the MOS field effect transistor is approximately 0.2Ω. Therefore, a MOS field effect transistor has a lower conduction loss than an insulated gate bipolar transistor when the flowing current is 7.5 A or smaller.

In view of the comparison of conduction losses, it is desired to adopt a MOS field effect transistor as the switching element S1 for reducing a loss when the air conditioner 900 is operated at the intermediate operating capacity or less and accordingly enhancing the annual performance factor.

FIG. 6 applies to the current flowing through a normal reactor corresponding to the inductance of the curve 101 as well as the current flowing through a swing choke corresponding to the inductance of the curve 102. This is because the both inductances coincide with each other in the area in which the current IL1 is smaller than the value I1.

Figure 7:
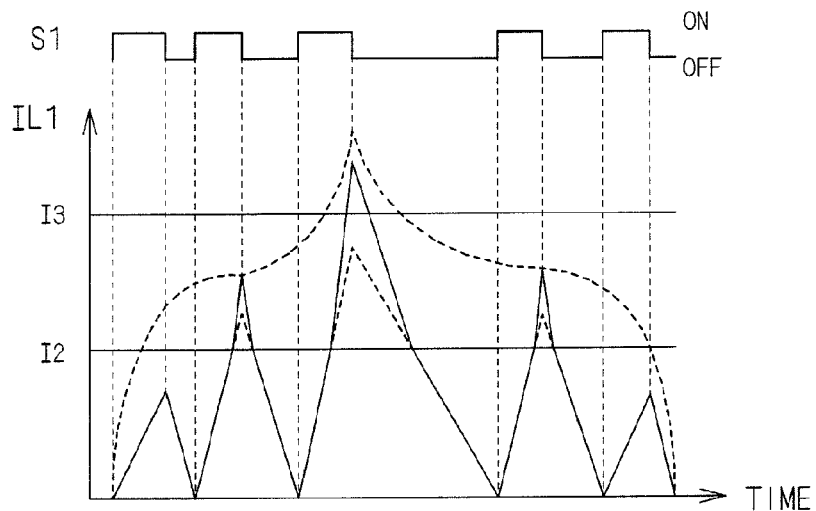
FIG. 7 is another graph showing a current flowing through the reactor.

Considered here is the case where it is required to increase the operating capacity to make the current IL1 large. FIG. 7 is a graph in a case where the operating capacity is high and the flowing current IL1 exceeds the value I2 (>I1) when a normal reactor whose inductance is indicated by the curve 101 is used. As shown in FIG. 5, the curve 101 shows a sharp decrease approximately after the current IL1 exceeds the value I2, and a slope of the decrease becomes sharper at the value I3 (>I2).

Even if the current IL1 exceeds the value I2, the slope of the waveform of the current IL1 is supposed to be the same (see a dashed line of a triangle wave in FIG. 7) as the graph shown in FIG. 6 unless the inductance of the reactor L1 decreases. However, the inductance of the reactor L1 decreases, and accordingly, the slope of the current IL1 becomes steep when exceeding the value I2, which causes a large current to flow (see a solid line of a graph in FIG. 7). As a result, a portion even exceeding the value I3 is generated in the current IL1, and its slope becomes steeper. Accordingly, the envelope of the current IL1 is largely distorted, which is not desirable from the viewpoint of the prevention of harmonics. Moreover, it is feared that the switching frequency may decrease and enter the audible frequency band if the critical current mode is adopted, and besides, it is feared that a shift to the continuous current mode may tend to occur and electrical noise may increase if the non-continuous current mode is adopted.

Figure 8:
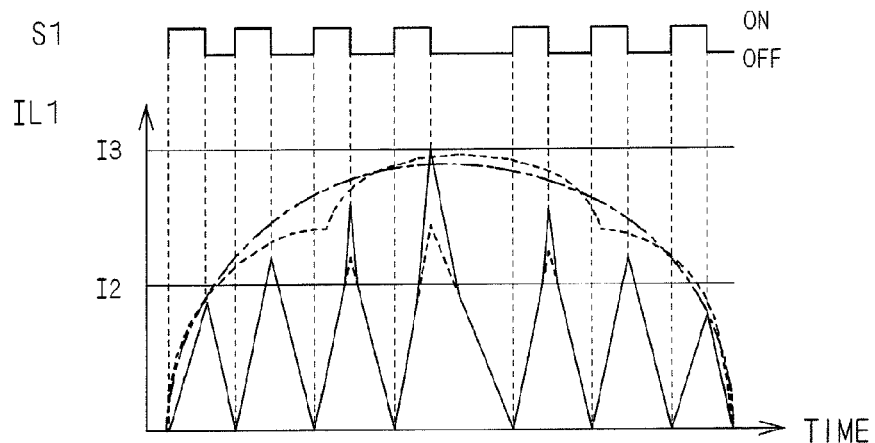
FIG. 8 is still another graph showing a current flowing through the reactor.

Meanwhile, FIG. 8 is a graph in a case where the operating capacity is high and the flowing current IL1 exceeds the value I2 when a swing choke whose inductance is indicated by the curve 102 is used as the reactor L1. As indicated by the curve 102, the inductance decreases temporarily as the current IL1 becomes larger, but the inductance does not decrease much even if the current IL1 becomes much larger. Therefore, if the current IL1 exceeds the value I2, the slope of the current IL1 does not become steep much even when exceeding the value I2 and does not reach the value I3. Accordingly, the waveform of the envelope of the current IL1 is not distorted much, and an average value of the envelope (see a chain line of FIG. 8) becomes close to a sine wave.

The air conditioner 900 is generally operated so as to perform a maximum operation or less but, in some cases, is transiently operated exceeding the maximum operation. It is desired that the inductance of the reactor L1 should not decrease for maintaining efficiency even in those cases. When the current IL1 is large, the conduction loss of the switching element S1 becomes dominant as a loss of the booster circuit B1, and the loss due to a copper loss of the reactor L1 increases in proportion to a square of the current IL1. Therefore, it is desired to prevent the inductance from becoming small and a peak value of the current IL1 from becoming large (similarly to the waveform shown in FIG. 7).

Meanwhile, it is not desired to increase the inductance for preventing the operation in a continuous current mode or preventing the switching frequency from becoming small in a critical current mode. Accordingly, the inductance is desired to take the constant value L12 when the current IL1 takes the value I3 or larger.

Figure 9:
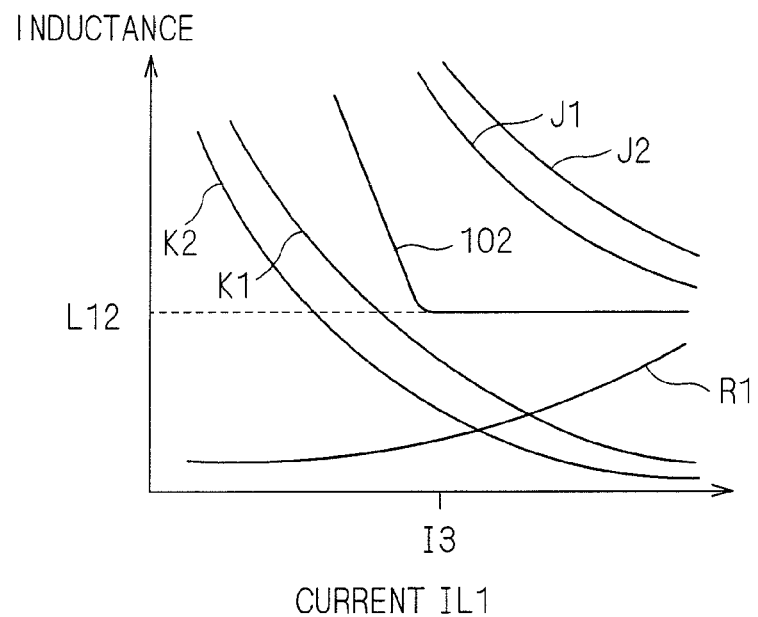
FIG. 9 is a graph showing an inductance of a reactor adopted in the power factor correction circuit.

Description is given of the fact that the inductance of the reactor L1 in which a swing choke is adopted is constant at the value L12 in the area in which the current IL1 is the value I3 or larger. As in FIG. 5, the inductance is indicated by the curve 102. Note that FIG. 9 shows the area near the value I3 taken by the current IL1, which is enlarged more compared with FIG. 5.

Curves J1 and J2 each indicate a value of the inductance of the reactor L1 in a case where the frequency of mechanical vibration becomes constant.

According to Mamoru Kitamura, 'Critical Mode for Creating Power Supply against 1.5 kW Low Noise/Interleaved PFC IC R2A20112', Transistor Gijutsu, May 2008, CQ Publishing Co., Ltd., pp. 176-184, if the minimum AC voltage (effective value) input to the diode rectifier circuit 3, the output voltage of the booster circuit B1, power factor, and efficiency are constant, the inductance of the reactor L1 is inversely proportional to the product of a maximum value of output power of the booster circuit B1 and a minimum value of PWM frequency. The maximum value of output power can be considered to be proportional to the product of the output voltage and the output current, and the minimum value of PWM frequency can be considered as a minimum value of the switching frequency. Therefore, the inductance of the reactor L1 is inversely proportional to the current IL1 if the switching frequency is fixed and becomes smaller as the switching frequency becomes higher.

The description above reveals that the inductance values indicated by the curves J1 and J2 become smaller as the current IL increases. The value of the frequency corresponding to the inductance indicated by the curve J1 is larger than the value of the frequency corresponding to the inductance indicated by the curve J2, which are, for example, 20 kHz and 10 kHz, respectively.

Curves K1 and K2 each indicate the value of the inductance of the reactor L1 in a case where the efficiency of the booster circuit B1 is constant. However, as for the efficiency, a copper loss of the reactor L1 is not taken into consideration. Accordingly, the efficiency becomes lower as the switching loss becomes higher, and the switching loss becomes higher as the switching frequency becomes higher. Also taking into consideration that the booster circuit B1 operates not only in a non-continuous current mode but also in a critical current mode for increasing the current IL1 while lowering the switching frequency, a peak of the current output from the booster circuit B1 during a period in which switching is not made is caused to be higher by reducing an inductance value. For this reason, in order to make the current IL1 large at equal efficiency, the inductance is made smaller as the current IL1 is larger.

The description above reveals that the efficiency values indicated by the curves K1 and K2 become smaller as the current IL1 increases. The value of the efficiency corresponding to the inductance indicated by the curve K1 is larger than the value of the efficiency corresponding to the inductance indicated by the curve K2, which are, for example, 95% and 97%, respectively.

Meanwhile, the efficiency of the booster circuit B1 is impaired by a copper loss of the reactor L1 in addition to the switching loss described above. The copper loss of the reactor L1 is proportional to a square of the current IL1. A curve R1 indicates the copper loss, and its rate of increase becomes larger as the current IL1 increases.

From the above, it is desired that the inductance of the reactor L1 be smaller than the value indicated by the curve J1 from the viewpoint that the frequency of mechanical vibrations does not readily enter an audible range, and be larger than the values indicated by the curves K1 and R1 from the viewpoint of enhancing efficiency. In particular, from the viewpoint that power is supplied to an air conditioner required to have operating capacity equal to or more than the maximum capacity operation even in a transient manner, the inductance is desired to be larger than the value indicated by the curve R1 in the area in which the current IL1 has approximately the value I3 or more.

If the inductance is larger than the value indicated by the curve J1, and for example, the switching frequency becomes lower than 20 kHz, which itself does not mean that the embodiment cannot be carried out. If the inductance is smaller than the value indicated by the curve J2 even though it is larger than the value indicated by the curve J1, and for example, if the switching frequency is larger than 15 kHz, in some cases, an operating sound of the refrigerant compressor 7, wind noise of a fan (not shown) normally adopted in the outdoor unit 902, or noise resulting from the carrier frequency of the inverter 5 is larger than noise resulting from the switching frequency of the power factor correction circuit 4. In those cases, it is not required to take a specific measure against the noise generated from the power factor correction circuit 4. That is, if the switching frequency does not decrease to fall below approximately a high-frequency limit of an audible range, it can be recognized that the effects of the present embodiment are achieved.

As described above, in the swing choke, the inductance shows almost flat characteristics in the area of a large current, and accordingly, it is possible to keep the inductance large also in a case where the current IL1 flowing through the reactor L1 adopting this is large. This prevents an efficiency decrease while preventing the switching frequency from reaching the audible frequency band and preventing noise.

It is possible to prevent the waveform of an output current from becoming steep. That is, an effect that harmonics of the output current can be prevented is brought about. In addition, there is achieved another effect that an element for small current, for example, a field effect transistor can be adopted as the switching element S1. Further, there is achieved still another effect that a decrease in switching frequency is prevented.

The inductance in the area in which the current IL1 flowing through the reactor L1 is small is larger than the inductance in the area in which the current IL1 is large, which enables to enhance efficiency in the area in which the current IL1 is small.

Normally, the operating capacity of an air conditioner varies in a wide range from the capacity lower than the intermediate operating capacity to the full-load operating capacity, and the load of the inverter 5 (for example, compressor 7) also varies largely. Therefore, the following effect is achieved by the inductance of the reactor L1 taking the value L11 when the air conditioner 900 operates at the intermediate operating capacity and the capacity lower than the intermediate operating capacity and taking the value L12 (<L11) when the air conditioner 900 transiently operates at the capacity exceeding the full-load operating capacity and when the air conditioner 900 operates at the full-load operating capacity as described above. That is, even if the load of the inverter 5 is large, noise of the switching power supply circuit, among others, the power factor correction circuit 4, does not readily reach the audible sound range, and a loss caused in the case of a small load is reduced.

The inductance of the reactor L1 takes the value L11 also when the air conditioner 900 operates at the rated capacity, so that a loss is reduced also at the rated capacity.

The inductance of the reactor L1 takes a value for making the switching frequency equal to or larger than the audible frequency, so that the noise generated by the switching power supply circuit, among others, the power factor correction circuit 4, does not reach the audible sound range, and the generation of noise is avoided.

Figure 10:
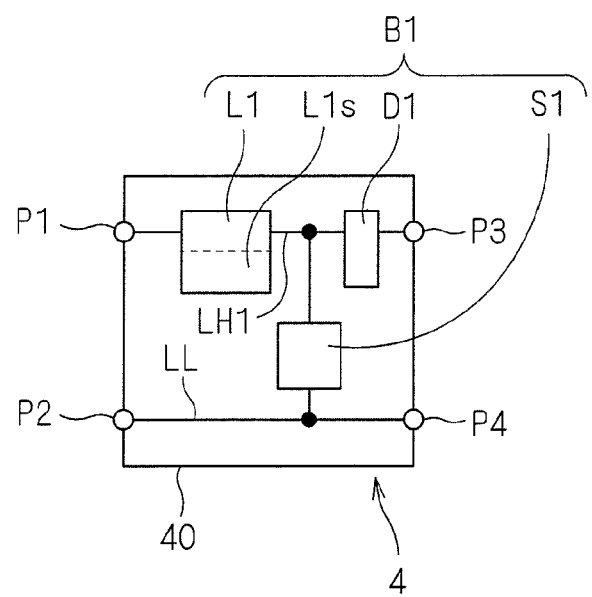
FIG. 10 is a diagram showing an appearance of a power factor correction circuit 4.

FIG. 10 is a diagram showing an appearance of the power factor correction circuit 4. In the power factor correction circuit 4, the paths LL and LH1, the input ends P1 and P2, and the output ends P3 and P4 are implemented on a printed circuit board 40. Further, the reactors L1 and L1s, the diode D1, and the switching element S1 are mounted on the printed circuit board 40.

As described above, the heat generation of the reactor L1 is reduced by increasing the inductance of the reactor L1 particularly in the area in which the current IL1 is large. Therefore, it is not required to separate and thermally isolate the reactor L1 from the printed circuit board 40 on which the switching element S1 is mounted. In other words, even if the reactor L1 is mounted on the printed circuit board 40 on which the switching element S1 is mounted, the first switching element S1 is not affected much by the heat generation. This is preferable particularly in the case where a semiconductor element is adopted as the switching element S1. The reactor L1 is mounted on the printed circuit board 40 on which the switching element S1 is mounted, whereby the connection line for connecting the reactor L1 and the printed circuit board 40 becomes unnecessary. As a result of the omission of the above-mentioned connection line, the number of parts can be reduced, and besides, noise resulting from the connection line can be avoided.

An interleaved power factor correction circuit may be adopted as the power factor correction circuit 4. FIG. 11 is a circuit diagram showing the configuration of the interleaved power factor correction circuit. The configuration shown in FIG. 11 is obtained by providing a switching element S2, reactors L2 and Ls2, a diode D2, and a path LH2 to the configuration shown in FIG. 1.

The reactor L2 is provided on a path LH2 connecting the input end P1 and the output end P3. The diode D2 is connected in series with the reactor L2 on the output end P3 side on the path LH2. The diode D2 has an anode directed to the reactor L2. The switching element S2 is provided between a point located between the reactor L2 and the diode D2 and the path LL. Similarly to the switching element S1, the switching element S2 is not limited to a MOS field effect transistor and may be an insulated gate bipolar transistor, a bipolar transistor, or the like.

The reactor L2, diode D2, and switching element S2 connected to the path LH2 constitute a booster circuit B2. The booster circuits B1 and B2 function as the power factor correction circuit 4 for correcting the power factor of the input side. The power factor correction circuit 4 constitutes a switching power supply circuit together with the smoothing capacitor C. The controller 6 controls conduction/non-conduction of the switching elements S1 and S2 not only based on the current ILL but also based on the current IL2 flowing through the reactor L2, as shown in, for example, FIG. 12. The current IL flowing between the input ends P1 and P2 is a sum of the currents IL1 and IL2.

A reactor L2s is provided for detecting the current IL2, similarly to the reactor L1s. The reactor L2s constitutes a transformer together with the reactor L2. The controller 6 detects the current flowing through the reactor L2s and estimates the current IL2.

The switching elements S1 and S2 are rendered conducting in an exclusive manner, and the power factor correction circuit 4 operates in a critical current mode or a non-continuous current mode. The technique of controlling conduction/non-conduction of the switching elements S1 and S2 is well known as the interleaving operation, and thus, description thereof is not given further.

In the above-mentioned power factor correction circuit 4, a swing choke having the above-mentioned characteristics is adopted at least as the reactor L1, whereby the trade-off between enhancement of efficiency (or further, prevention of harmonics) and prevention of audible sound is improved.

In the above-mentioned example, the description has been given of a difference between the inductance of the reactor L1 at the maximum value of the current IL1 when an air conditioner is operated at the intermediate operating capacity or less or the rated operating capacity and the inductance of the reactor L1 at the maximum value of the current IL1 when an air conditioner is operated at other than the intermediate operating capacity or less or the rated operating capacity. However, it is apparent that the above-mentioned effects can be achieved if the inductance has a large flat area in the case of the small current IL1 and has a small flat area in the case of the large current IL1.

Similarly, if a swing choke is used as the reactor L2, there can be achieved effects that the harmonics of an output current is prevented, an element for small current is adopted as the switching element S2, and efficiency is enhanced in an area in which a current is small.

It is desired to use swing chokes for both of the reactors L1 and L2. However, it is apparent that even if a swing choke is used for any one of the reactors L1 and L2, the above-mentioned effects can be achieved, contrary to the case where normal reactors are used for both of the reactors L1 and L2.

While the invention has been shown and described in detail, the foregoing description is in all aspects illustrative and not restrictive. It is therefore understood that numerous modifications and variations can be devised without departing from the scope of the invention.

The invention claimed is:

1. A switching power supply circuit supplying a DC current to an inverter that drives a refrigerant compressor provided in a refrigerant cycle and functioning in a critical current mode or a non-continuous current mode, the circuit comprising:
   first and second input ends;
   first and second output ends;
   a first path connecting said first input end and said first output end;
   a first reactor provided on said first path;
   a first diode connected in series with said first reactor on said first output end side on said first path and having an anode directed to said first reactor side;
   a second path connecting said second input end and said second output end; and
   a first switching element provided between a point located between said first reactor and said first diode and said second path, wherein
   an inductance of said first reactor takes a first value at a maximum value of a current flowing through said first reactor when said refrigerant cycle operates with intermediate operating capacity or capacity lower than said intermediate operating capacity, and
   the inductance of said first reactor takes a second value smaller than said first value at a maximum value of a current flowing through said first reactor when said refrigerant cycle transiently operates at the capacity exceeding full-load operating capacity and when said refrigerant cycle operates at said full-load operating capacity.

2. The switching power supply circuit according to claim 1, wherein the inductance of said first reactor takes said first value at a maximum value of a current flowing through said first reactor when said refrigerant cycle operates at rated capacity.

3. The switching power supply circuit according to claim 2, wherein said refrigerant cycle is an air conditioner.

4. The switching power supply circuit according to claim 2, further comprising:
   a third path connecting said first input end and said first output end and differing from said first path;
   a second reactor provided on said third path;
   a second diode connected in series with said second reactor on said first output end side on said third path and having an anode directed to said second reactor side; and
   a second switching element provided between a point located between said second reactor and said second diode and said second path and being rendered conducting exclusively from said first switching element.

5. The switching power supply circuit according to claim 4, wherein said first switching element and said first reactor are mounted on the same printed circuit board.

6. The switching power supply circuit according to claim 5, wherein said refrigerant cycle is an air conditioner.

7. The switching power supply circuit according to claim 4, wherein said refrigerant cycle is an air conditioner.

8. The switching power supply circuit according to claim 2, wherein said first switching element and said first reactor are mounted on the same printed circuit board.

9. The switching power supply circuit according to claim 8, wherein said refrigerant cycle is an air conditioner.

10. The switching power supply circuit according to claim 1, wherein the inductance of said first reactor takes a value for making a switching frequency of said first switching element equal to or larger than an audible frequency.

11. The switching power supply circuit according to claim 10, wherein said refrigerant cycle is an air conditioner.

12. The switching power supply circuit according to claim 1, further comprising;
- a third path connecting said first input end and said first output end and differing from said first path;
- a second reactor provided on said third path;
- a second diode connected in series with said second reactor on said first output end side on said third path and having an anode directed to said second reactor side; and
- a second switching element provided between a point located between said second reactor and said second diode and said second path and being rendered conducting exclusively from said first switching element.

13. The switching power supply circuit according to claim 12, wherein said first switching element and said first reactor are mounted on the same printed circuit board.

14. The switching power supply circuit according to claim 13, wherein said refrigerant cycle is an air conditioner.

15. The switching power supply circuit according to claim 12, wherein said refrigerant cycle is an air conditioner.

16. The switching power supply circuit according to claim 1, wherein said first switching element and said first reactor are mounted on the same printed circuit board.

17. The switching power supply circuit according to claim 16, wherein said refrigerant cycle is an air conditioner.

18. The switching power supply circuit according to claim 1, wherein said refrigerant cycle is an air conditioner.

* * * * *